US006921781B2

(12) United States Patent
Schubert et al.

(10) Patent No.: US 6,921,781 B2
(45) Date of Patent: Jul. 26, 2005

(54) PROCESS FOR COVERING SILICAS WITH WAX

(75) Inventors: Juergen Schubert, Wachtberg (DE); Klaus-Dieter Hellwig, Bad Honnef (DE); Michael Pickel, Niederkassel (DE); Hans-Dieter Puetz, Bergheim (DE)

(73) Assignee: Degussa AG, Duesseldorf (DE)

( * ) Notice: Subject to any disclaimer, the term of this patent is extended or adjusted under 35 U.S.C. 154(b) by 305 days.

(21) Appl. No.: 09/934,471

(22) Filed: Aug. 23, 2001

(65) Prior Publication Data

US 2002/0055556 A1 May 9, 2002

(30) Foreign Application Priority Data

Aug. 23, 2000 (DE) .......................................... 100 41 465
May 11, 2001 (DE) .......................................... 101 22 861

(51) Int. Cl.$^7$ ................................................ C08K 3/34
(52) U.S. Cl. ....................... 523/216; 523/210; 523/212; 524/492; 106/482; 106/490; 106/491
(58) Field of Search .............................. 106/482, 490, 106/491; 523/210, 212, 216; 524/492

(56) References Cited

U.S. PATENT DOCUMENTS 3,816,154 A   6/1974   Baldyga et al.

FOREIGN PATENT DOCUMENTS

| DE | 10 06 100 | 4/1957 |
| DE | 15 92 865 | 2/1971 |
| DE | 40 32 619 | 4/1992 |
| EP | 0 442 325 | 8/1991 |
| EP | 0 541 359 | 5/1993 |
| EP | 0 922 671 | 6/1999 |
| EP | 0 922 691 | 6/1999 |
| WO | WO 97/08250 | 3/1997 |
| WO | WO 01/04217 | 1/2001 |

Primary Examiner—Edward J. Cain
(74) Attorney, Agent, or Firm—Oblon, Spivak, McClelland, Maier & Neustadt, P.C.

(57) ABSTRACT

The present invention provides a process, which includes:

coating at least a portion of a surface of at least one silica particle with at least one wax, wherein the coating is carried out in at least one gas at a temperature above the melting point of the wax and below the decomposition temperature of the wax, to obtain at least one wax-coated silica particle. Other embodiments of the present invention provides processes for impregnating the silica particle with wax and uses of the wax-coated or wax-impregnated particles.

32 Claims, No Drawings

PROCESS FOR COVERING SILICAS WITH WAX

BACKGROUND OF THE INVENTION

1. Field of the Invention

The present invention relates to a process for covering silicas with wax and the use of such silicas.

2. Discussion of the Background

Matting agents for coatings based on wax-impregnated silicas (or silicic acids) are known and described in DE 10 06 100, DE 15 92 865 and EP 0 922 691, for example. Typically, a wax emulsion is converted with a silica suspension and, if required, a dispersing agent. The impregnated or covered silica thus obtained must then be dried at some expense and often still contains the dispersing agent. In addition, the binding of the wax to the silica is inadequate for many applications.

Another process for coating silica with wax is described in EP 0 442 325. Here, the silica is first impregnated with a polyol, which facilitates binding the hydrophobic wax to the hydrophilic silica. Coatings containing the impregnated silica according to EP 0 442 325 exhibit an undesirably high viscosity, however. Comparative examples in EP 0 442 325 indicate that silicas not coated with wax or coated with wax without the addition of polyol considerably reduce the viscosity of a coating. This is believed to be due to the excessively hydrophilic surface of the silica particles compared to the hydrophobic coatings. A polyol must be added in order to counteract this effect, which undesirably introduces an additional process step.

A thermal process for processing silica gels or silica sols is disclosed in DE 10 06 100. Here, silica hydrogels are first manufactured and dried, and activated in a further step. The dried gel is activated by heating it to about 468–538° C. and then converted with a molten, microcrystalline wax at 371° C., wherein 15–30% by weight of wax, relative to the hydrosol, is used. The very fine hydrosol particles exhibit a mesh-type gel structure with a very large water concentration and can only be covered satisfactorily at the above-described high temperatures or high wax concentrations. The high thermal load prohibits the use of many waxes, however (because of a temperature-induced change in the color of the wax); and rapid cooling of the resultant wax-covered silica gel to below the decomposition temperature of the wax must be ensured. Covering of silicas is not described in DE 10 06 100.

Silicas and silica gels exhibit different structures on account of the differing respective manufacturing processes. Silicas are manufactured by basic precipitation and exhibit an open particle structure. Water can be removed easily from these open-pored silica particles. In contrast to silicas, silica gels are obtained by acidic precipitation and have a rather closed structure from which water cannot be easily removed.

Accordingly, there remains a need for a process of covering silicas with wax, which allows for easy handling of the covered silicas and enables good sedimentation stability and dispersibility of the coated silicas, in coatings, for example, with minimal use of wax.

SUMMARY OF THE INVENTION

Accordingly, one object of the invention is to provide a process for covering silicas with wax, which avoids the above-mentioned problems.

Another object of invention is to provide a process for covering silicas with wax, which allows for ease of handling of the coated silicas.

Another object of the invention is to provide a process for covering silicas with wax, which enables good sedimentation stability of the coated silicas.

Another object of the invention is to provide a process for covering silicas with wax, which enables good dispersibility of the coated silicas.

Another object of the invention is to provide a process for covering silicas with wax, which minimizes the use of wax.

These and other objects have now been attained by the present invention, the first embodiment of which provides a process, which includes:

coating at least a portion of a surface of at least one silica particle with at least one wax, wherein the coating is carried out in at least one gas at a temperature above the melting point of the wax and below the decomposition temperature of the wax, to obtain at least one wax-coated silica particle.

Another embodiment of the present invention provides a wax-coated silica particle, produced by the above-described process.

Another embodiment of the present invention provides a matting agent, which includes at least one wax-coated silica particle produced by the above-described process.

Another embodiment of the present invention provides a coating composition, which includes at least one wax-coated silica particle produced by the above-described process.

Another embodiment of the present invention provides an alkyd resin, which includes at least one wax-coated silica particle produced by the above-described process.

Another embodiment of the present invention provides a stoving paint, which includes at least one wax-coated silica particle produced by the above-described process.

Another embodiment of the present invention provides a process, which includes:

a step for coating at least a portion of a surface of at least one silica particle with at least one wax, wherein the coating is carried out in at least one gas at a temperature above the melting point of the wax and below the decomposition temperature of the wax, to obtain at least one wax-coated silica particle.

Another embodiment of the present invention provides a process, which includes:

a step for impregnating at least one pore of at least one silica particle with at least one wax, wherein the impregnating is carried out in at least one gas at a temperature above the melting point of the wax and below the decomposition temperature of the wax, to obtain at least one wax-impregnated silica particle.

Another embodiment of the present invention provides a process, which includes:

impregnating at least one pore of at least one silica particle with at least one wax, wherein the impregnating is carried out in at least one gas at a temperature above the melting point of the wax and below the decomposition temperature of the wax, to obtain at least one wax-impregnated silica particle.

DESCRIPTION OF THE PREFERRED EMBODIMENTS

Various other objects, features and attendant advantages of the present invention will be more fully appreciated as the same becomes better understood from the following detailed description of the preferred embodiments of the invention.

Preferably, the present process for covering silica with wax is carried out at a temperature above the melting range and below the decomposition temperature of the wax in air.

Covering of the silica is preferably performed simultaneously with pulverizing, for instance in an impact mill, or sequentially. In either case, it is preferable to mix the constituent wax and silica together prior to the covering step in a suitable mixing apparatus, preferably an Eirich mixer.

The melting and decomposition ranges of the waxes employed in the process according to the present invention are preferably between 40 and 250° C., more preferably between 60 and 200° C., and particularly preferably between 70 and 130° C. The process according to the present invention is preferably carried out at these temperatures. These ranges include all values and subranges therebetween, including 45, 50, 55, 75, 90, 100, 110, 140, 160, 180, 190, 220, 240 and 245° C.

The process can be carried out with suitably heated or pre-heated air or inert gases, more preferably pre-heated air or heated inert gases. Preferably, the air or inert gas or gases are dry. Preferable inert gases include nitrogen and argon. Mixtures of air and/or gases are possible.

The silica is not particularly limited, and may be any silica known in the art to which this invention pertains. Preferable silicas include precipitated silicas, and more preferable silicas include those described in the examples. However, corresponding Aerosil grades are also preferred.

Preferable waxes or coating agents include polyethylene (PE) waxes, Fischer-Tropsch waxes or silicone-based waxes. Combinations of waxes are possible.

Preferably, the silica is covered with 2 to 15% by weight of wax, more preferably 3 to 10% by weight, and most preferably 4 to 6% of wax, relative to the weight of the silica. These ranges include all values and subranges therebetween, including 3, 5, 7, 8, 9, 11, 12, 13, and 14% by weight.

Preferably, the silica is not coated with a polyol prior to coating.

Preferably, the silica has a BET adsorption ranging from 10 to 700 $m^2/g$, more preferably 100 to 600 $m^2/g$, more particularly preferably 150 to 400 $m^2/g$, and most preferably 150 to 300 $m^2/g$. These ranges include all values and subranges therebetween, including 25, 50, 75, 125, 175, 200, 250, 350, 450, 500, 550, 625 and 675 $m^2/g$.

Preferably, the silica has a DBP value ranging from 10 to 600 g/100 g, more preferably 50 to 500 g/100 g, more particularly preferably 100 to 400 g/100 g, and most preferably 200 to 300 g/100 g. These ranges include all values and subranges therebetween, including 25, 75, 125, 150, 175, 225, 250, 275, 325 and 425 g/100 g.

Preferably, the silica has an average particle size ranging from 0.9 to 500 µm, more preferably 1 to 400 µm, more particularly preferably 2 to 300 µm, and most preferably 3 to 200 µm. These ranges include all values and subranges therebetween, including 4, 5, 6, 7, 8, 9, 10, 12, 16, 20, 25, 30, 40, 50, 100, 250 and 350 µm.

Preferably, the coated silica has an average particle size ranging from 0.9 to 500 µm, more preferably 1 to 400 µm, more particularly preferably 1.5 to 300 µm, and most preferably 2 to 200 µm. These ranges include all values and subranges therebetween, including 3, 4, 5, 6, 7, 8, 9, 10, 12, 16, 20, 25, 30, 40, 50, 100, 250 and 350 µm.

Preferably, prior to coating, the wax or coating agent is in particulate form.

The silicas covered according to the present invention are particularly suitable for use as matting agents for coatings and/or lacquers, preferably alkyd resin or other stoving paints. As such, a preferred embodiment of the present invention is a matting agent, a coating, a lacquer, an alkyd resin, and/or a stoving paint, which includes the silica coated according to the present invention.

In a preferred embodiment, precipitated silica and a coating agent (wax) in a ratio of 3 to 15% by weight are mixed together homogeneously in a mixing apparatus, such as an Eirich mixer. This mixture is milled and classified in a classifier mill (e.g. 50 ZPS or similar) or a jet mill. The milling chamber is heated during milling by spraying in heated air (60–160° C.), in such a way that at the mill outlet the air still has a temperature of 40–140° C. The product is separated off by a filter or cyclone separator. The product covered with the coating agent exhibits a carbon content of 2 to 18% by weight, preferably 3 to 10% by weight, particularly preferably 3 to 6% by weight. The particle fraction can be adjusted by subsequent classification.

EXAMPLES

Having generally described this invention, a further understanding can be obtained by reference to certain specific examples, which are provided herein for purposes of illustration only and are not intended to be limiting unless otherwise specified.

Example 1

Data of the Silicic Acid and Coating Agent Used

TABLE 1

| Silica | | Coating agent | |
|---|---|---|---|
| BET ($m^2/g$) | 200 | micro powder (µm) | 8.5 |
| DBP (g/100 g) | 230 | melting point (DSC) (° C.) | 110–118 |
| $d_{10}$ | 4.66 | melt viscosity at 120° C. ($mm^2/s$) | 135–240 |
| $d_{50}$ | 9.11 | molar mass (GPC) (g/mol) | approx. 3,500 |
| $d_{90}$ | 23.10 | density at 23° C. ($g/cm^3$) | 0.940–0.955 |

The precipitated silica from Table 1 is mixed with 6% by weight of PE wax (Table 1). The mixture is ground at various process parameters, such as air separation speed, mill speed or grinding air, in a Zirkoplex XPS 50 air separation mill of the Alpine Co., in which the exit temperature of the grinding air (measured at the mill outlet) is 120° C. The experimental parameters, the physiochemical data and the results for the lacquer, obtained in black stove enamel, are listed in Table 2.

TABLE 2

| | | |
|---|---|---|
| Air separation speed | (rpm) | 10,500 |
| Mill speed | (rpm) | 9,500 |
| $d_{10}$ | (µm) | 2.82 |
| $d_{50}$ | (µm) | 5.24 |
| $d_{90}$ | (µm) | 8.91 |
| C content | (%) | 3.3 |
| Grindometer value | (µm) | 30 |
| Gloss 60° | | 19.7 |
| Gloss 60° relative to standard | | 1.7 |
| Sedimentation | | 2- |

Example 2

Variation of the Silicic Acid and Coating Temperature

A precipitated silicic acid such as Sipemat 50 is intimately mixed with a PE wax such as AF 30 (BASF) in the ratio of 6 parts of wax and 94 parts of silicic acid. This mixture is proportioned into an impact air separation mill (ZPS 50). The impact air separation mill is operated with preheated grinding air during grinding. The exit temperature of the grinding air from the mill is varied. The grinding settings (speed of air separation wheel and mill) are not critical for coating the silicic acid with wax, but are chosen such that the product has a distribution suitable for the desired flatting efficiency.

Characteristics of Silicic Acid Used:

| | | | |
|---|---|---|---|
| BET surface (m²/g) | 450 | | |
| Mean particle size (µm) | 27 | (measuring instrument: Coulter LS 230) | |
| Tamped density (g/l) | 180 | (not sieved) | |
| Drying Loss (%) | 6.0 | (2 h at 105° C.) | |
| Ignition Loss (%) | 5.0 | (2 h at 1000° C.) | |
| pH | 6.0 | (5% in water) | |
| DBP absorption (g/100 g) | 335.0 | | |

TABLE 3

| | | Outlet temperature (° C.) | | |
|---|---|---|---|---|
| | | 120 | 100 | 80 |
| Wax name | | AF 30 | AF 30 | AF 30 |
| d10* | (µm) | 4.48 | 4.63 | 4.67 |
| d50* | (µm) | 8.44 | 8.88 | 8.54 |
| d90* | (µm) | 13.96 | 14.63 | 14.05 |
| C content | (%) | 5.48 | 5.94 | 5.67 |
| Grindometer | (µm) | 25 | 30 | 27 |
| Gloss at 60° relative to standard** | (%) | −5.5 | 1.7 | 0.8 |
| Sedimentation*** | | 2 | 2 | 5 |
| Wax detachment | | None | None | — |

*Measuring instrument: Coulter LS 230
**Standard: Acematt HK 460, Degussa AG
***Measured according to sedimentation analysis method outlined below Example 3

Variation of the Wax and the Softening Temperature of the Wax

The experiment is carried out as described in Example 2. The waxes used have a lower softening point than that used in Example 2.

TABLE 4

| Wax | Manufacturer | Softening point (° C.) |
|---|---|---|
| AF 30 | BASF | 105 to 112 |
| SL 555 | Daniel Products | 82 to 86 |
| Aquabead 916 | Micropowders | 64 to 67 |

TABLE 5

| | | Wax name | | |
|---|---|---|---|---|
| | | AF 30 | SL 555 | Aquabead 916 |
| Outlet temperature | (° C.) | 120 | 120 | 120 |
| d10* | (µm) | 4.48 | 4.57 | 4.58 |
| d50* | (µm) | 8.44 | 8.88 | 8.98 |
| d90* | (µm) | 13.96 | 14.84 | 15.29 |
| C content | (%) | 5.48 | 5.31 | 4.97 |
| Grindometer value | (µm) | 25 | 28 | 29 |
| Gloss at 60° relative to standard** | (%) | −5.5 | −4.9 | −5.5 |
| Sedimentation*** | | 2 | 2 | 2 |
| Wax detachment | | none | none | none |

TABLE 6

| | | Wax name | | |
|---|---|---|---|---|
| | | AF 30 | SL 555 | Aquabead 916 |
| Outlet temperature | (° C.) | 100 | 100 | 100 |
| d10* | (µm) | 4.57 | 4.46 | 4.13 |
| d50* | (µm) | 8.88 | 8.77 | 7.76 |
| d90* | (µm) | 14.63 | 13.31 | 11.83 |
| C content | (%) | 5.94 | 5.69 | 4.97 |
| Grindometer value | (µm) | 30 | 29 | 31 |
| Gloss at 60° relative to standard** | (%) | 1.7 | 0.5 | −0.1 |
| Sedimentation*** | | 2 | 2 | 2 |
| Wax detachment | | none | none | none |

TABLE 7

| | | Wax name | | |
|---|---|---|---|---|
| | | AF 30 | SL 555 | Aquabead 916 |
| Outlet temperature | (° C.) | 80 | 80 | 80 |
| d10* | (µm) | 4.67 | 4.18 | 4.15 |
| d50* | (µm) | 8.54 | 8.17 | 7.79 |
| d90* | (µm) | 14.05 | 12.56 | 11.75 |
| C content | (%) | 5.67 | 5.79 | 4.76 |
| Grindometer value | (µm) | 27 | 27 | 31 |
| Gloss at 60° relative to standard** | (%) | 0.8 | 1.1 | −1.2 |
| Sedimentation*** | | 5 | 2 | 2 |
| Wax detachment | | — | none | none |

*Measuring instrument: Coulter LS 230
**Standard: Acematt HK 460, Degussa AG
***Measured according to sedimentation analysis method outlined below Analysis Methods:
Sedimentation About 40 g of flatted lacquer is filled into glass bottles and the glass bottles are sealed with screw caps. The samples are stored in a drying oven for 10 days at 50±2° C.

For evaluation, the glass bottles are cooled to room temperature.

In order to test the nature of the bottom sediment, the glass bottles are turned upside down and the downward flow of the phase containing the flatting agent is observed.

The glass bottles are then shaken 2 times by hand. If no bottom sediment can be seen visually, the bottom of the bottle is scratched with a needle. With this treatment even paper-thin, undesired deposits are revealed.

The nature of the bottom sediment is scored as follows:

| Score | Evaluation |
|---|---|
| 1 | No separation of lacquer and flatting agent |
| 2 | Loose bottom sediment (The sediment flows completely off from the bottom and can be dispersed by turning upside down one to two times.) |
| 3 | Soft bottom sediment (The sediment does not flow completely off from the bottom, but can still be dispersed by repeated shaking.) |
| 4 | Soft bottom sediment, difficult to stir up (The sediment is still soft, but is already agglomerated so strongly that it can no longer be dispersed adequately by shaking.) |
| 5 | Hard bottom sediment. |

Wax Detachment 1 g of flatting agent and 35 g of ethoxypropyl acetate are weighed into a 50 ml wide-necked screw-cap bottle. The cap is screwed on securely and the bottle is shaken by hand. The bottle is kept at 50° C. overnight.

If the wax becomes detached from the flatting agent under these conditions, it floats on the solvent, while the flatting agent settles on the bottom.

If no wax detachment occurs, only a sediment of flatting agent on the bottom is obtained.

The examples show that the inventive coating process must be performed above the melting range of the wax. The terms "melting range" and "softening point" are to be understood as synonyms here.

Obviously, numerous modifications and variations of the present invention are possible in light of the above teachings. It is therefore to be understood that within the scope of the appended claims, the invention may be practiced otherwise than as specifically described herein.

This application is based on German patent applications DE 10041465.6 filed Aug. 23, 2000, and DE 10122861.9, filed May 11, 2001, the entire contents of each of which are hereby incorporated by reference.

What is claimed is:

1. A process comprising:
coating at least a portion of a surface of at least one silica particle with at least one wax wherein said coating is carried out in a milling chamber with at least one gas at a temperature above the melting point of said wax, while
spraying a gas heated to a temperature of from 60 to 160° C. into the milling chamber wherein the temperature of the gas at an outlet of the milling chamber is from 40 to 140° C.,
to obtain at least one wax-coated silica particle.

2. The process as claimed in claim 1, wherein said gas is selected from the group consisting of air, nitrogen, argon, and a mixture thereof.

3. The process as claimed in claim 1, further comprising milling said silica particle.

4. The process as claimed in claim 3, wherein the milling is carried out simultaneously with the coating.

5. The process as claimed in claim 3, wherein the milling is carried out prior to the coating.

6. The process as claimed in claim 1, wherein the temperature ranges from 40 to 200° C.

7. The process as claimed in claim 1, wherein said silica particle is coated with 2 to 15% by weight of wax, relative to the weight of the silica particle.

8. The process as claimed in claim 1, wherein said wax, silicone-based wax, and mixtures therof.

9. The process as claimed in claim 1, further comprising classifying said silica particle.

10. The process as claimed in claim 1, further comprising classifying said wax-coated silica particle.

11. The process as claimed in claim 1, further comprising producing said silica particle by acidic precipitation.

12. The process as claimed in claim 1, further comprising prior to said coating, drying said silica particle.

13. The process as claimed in claim 1, further comprising contacting said wax-coated silica particle with a coating composition.

14. A wax-coated silica particle, produced by the process as claimed in claim 1.

15. A matting agent, comprising at least one wax-coated silica particle produced by the process as claimed in claim 1.

16. A coating composition, comprising at least one wax-coated silica particle produced by the process as claimed in claim 1.

17. An alkyd resin, comprising at least one wax-coated silica particle produced by the process as claimed in claim 1.

18. A stoving paint, comprising at least one wax-coated silica particle produced by the process as claimed in claim 1.

19. A process, comprising:
a step for coating at least a portion of a surface of at least one silica particle with at least one wax, wherein said coating is carried out in a milling chamber with at least one gas at a temperature above the melting point of said wax while spraying a gas heated to a temperature of from 60 to 160° C. into the milling chamber, wherein the temperature of the gas at an outlet of the milling chamber is from 40 to 140° C.,
to obtain at least one wax-coated silica particle.

20. A process, comprising:
a step for impregnating at least one pore of at least one silica particle with at least one wax, wherein said coating is carried out in a milling chamber with at least one gas at a temperature above the melting point of said wax while spraying the gas heated to a temperature of from 60 to 160° C. into the milling chamber, wherein the temperature of the gas at an outlet of the milling chamber is from 40 to 140° C.,
to obtain at least one wax-impregnated silica particle.

21. A process, comprising:
impregnating at least one pore of at least one silica particle with at least one wax, wherein said impregnating is carried out in a milling chamber with at least one gas at a temperature above the melting point of said wax while spraying the gas heated to a temperature of from 60 to 160° C. into the milling chamber, wherein the temperature of the gas at an outlet of the milling chamber is from 40 to 140° C.,
to obtain at least one wax-impregnated silica particle.

22. The process as claimed in claim 1, wherein the wax has a melting point of 64° C. to 112° C.

23. The process as claimed in claim 1, wherein the wax has a melting point of from 64° C. to 86° C.

24. The wax-coated silica particles as claimed in claim 14, wherein the wax-coated silica particle does not detach the wax when kept at 50° C. in ethoxypropylacetate.

25. The process as claimed in claim 22, wherein the coating is carried out at a temperature of from 40° C. to 120° C.

26. The process as claimed in claim 22, wherein the coating is carried out at a temperature of from 40° C. to 100° C.

27. The process as claimed in claim 22, wherein the coating is carried out at a temperature of from 40 to 80° C.

28. The process as claimed in claim 1, wherein the coating is carried out with a single wax.

29. The process as claimed in claim 19, wherein the coating is carried out with a single wax.

30. The process as claimed in claim 20, wherein the impregnating is carried out with a single wax.

31. The process as claimed in claim 21, wherein the impregnating is carried out with a single wax.

32. The process as claimed in claim 1, wherein the wax has a melting point of from 64° C. to 118° C.

* * * * *